United States Patent
Jensen

(10) Patent No.: US 9,677,870 B2
(45) Date of Patent: Jun. 13, 2017

(54) INTERFEROMETRIC DISTANCE MEASURING METHOD FOR MEASURING SURFACES, AND SUCH A MEASURING ARRANGEMENT

(75) Inventor: Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/129,044

(22) PCT Filed: Jun. 25, 2012

(86) PCT No.: PCT/EP2012/062246
§ 371 (c)(1),
(2), (4) Date: Dec. 23, 2013

(87) PCT Pub. No.: WO2013/000866
PCT Pub. Date: Jan. 3, 2013

(65) Prior Publication Data
US 2014/0139846 A1   May 22, 2014

(30) Foreign Application Priority Data
Jun. 27, 2011  (EP) .................................... 11171582

(51) Int. Cl.
*G01B 11/02*   (2006.01)
*G01B 9/02*   (2006.01)

(52) U.S. Cl.
CPC ..... *G01B 9/02049* (2013.01); *G01B 9/02004* (2013.01); *G01B 9/0209* (2013.01); *G01B 9/02057* (2013.01); *G01B 9/02065* (2013.01)

(58) Field of Classification Search
CPC ............ G01B 9/02049; G01B 9/02004; G01B 9/02057; G01B 9/02065; G01B 9/0209; G01B 9/02091
(Continued)

(56) References Cited

U.S. PATENT DOCUMENTS 4,627,731 A    12/1986  Waters et al.
5,070,483 A *  12/1991  Berni ....................... G01H 9/00
                                                356/28.5
(Continued)

FOREIGN PATENT DOCUMENTS

CN        1784587 A    6/2006
CN     101128717 A    2/2008
(Continued)

OTHER PUBLICATIONS

European Search Report dated Nov. 22, 2011 as received in Application No. EP 11 17 1582.
(Continued)

*Primary Examiner* — Tarifur Chowdhury
*Assistant Examiner* — Jonathon Cook
(74) *Attorney, Agent, or Firm* — Maschoff Brennan

(57) ABSTRACT

A distance measuring method for measuring surfaces uses a laser source having a frequency that can be modulated to tune a wavelength of a laser beam in a wavelength range. The laser beam is generated with a coherence length to provide a measuring beam and is emitted at the surface, located within a specified distance range, as a measuring beam. The measuring beam is back-scattered by the surface and is received again and used to interferometrically measure the distance from a reference point to the surface. The specified distance range lies at least partly outside of the coherence length. One portion of the laser beam is temporally delayed with respect to another portion, such that the one optical path difference caused by the delay matches the optical path difference that corresponds to a distance in the specified distance range plus or minus the coherence length of the laser.

20 Claims, 9 Drawing Sheets

(58) Field of Classification Search
USPC .......................................................... 356/498
See application file for complete search history.

(56) References Cited

U.S. PATENT DOCUMENTS

| | | | |
|---|---|---|---|
| 6,490,046 | B1 | 12/2002 | Drabareck et al. |
| 6,724,485 | B1* | 4/2004 | Drabarek ...................... 356/485 |
| 7,619,719 | B2 | 11/2009 | Rohner et al. |
| 2003/0175005 | A1* | 9/2003 | Bauer ...................... G02B 6/10 385/145 |
| 2004/0061865 | A1 | 4/2004 | Drabarek |
| 2007/0115476 | A1 | 5/2007 | Feldchtein et al. |
| 2008/0117436 | A1 | 5/2008 | Altenberger et al. |
| 2009/0033943 | A1 | 2/2009 | Franz et al. |
| 2010/0312524 | A1 | 12/2010 | Siercks et al. |
| 2011/0285383 | A1* | 11/2011 | Itsuji ............................... 324/96 |

FOREIGN PATENT DOCUMENTS

| | | |
|---|---|---|
| CN | 101278170 A | 10/2008 |
| CN | 101561296 A | 10/2009 |
| DE | 198 19 762 A1 | 11/1999 |
| WO | 01/83693 A2 | 11/2001 |
| WO | 2004079294 A2 | 9/2004 |
| WO | 2004079295 A2 | 9/2004 |
| WO | 2006/017619 A2 | 2/2006 |
| WO | 2006/091866 A2 | 8/2006 |
| WO | 2009/036861 A1 | 3/2009 |
| WO | 2009/059406 A1 | 5/2009 |

OTHER PUBLICATIONS

Hartvig P et al., "Kinetics of four <11>C-labelled enkephalin peptides in the brain, pituitary and plasma of Rhesus monkeys", Regulatory Peptides, Elsevier Science BV, NL, vol. 16, No. 1, Dec. 1, 1986, pp. 1-13.

Henriksen G et al., "Proof of principle for the use of 11C-labelled peptides in tumour diagnosis with PET", European Journal of Nuclear Medicine and Molecular Imaging, Springer Verlag, Heidelberg, DE, vol. 31, No. 12, Aug. 10, 2004, pp. 1653-1657.

* cited by examiner

INTERFEROMETRIC DISTANCE MEASURING METHOD FOR MEASURING SURFACES, AND SUCH A MEASURING ARRANGEMENT

FIELD OF THE INVENTION

Some embodiments of the invention relate to an interferometric distance measuring method for measuring surfaces, a distance measuring arrangement, and also a measuring device for measuring surfaces.

BACKGROUND

The requirement exists in many fields of application for measuring surfaces of objects and therefore also the objects themselves with high precision. This is true in particular for the manufacturing industry, for which the measuring and checking of surfaces of workpieces has high significance. A variety of approaches exist for this purpose, which extend from contacting methods up to optical sensors. In the field of high-precision optical methods, interferometric measuring principles, in particular in conjunction with the use of coordinate measuring devices, play an increasing role.

One possibility is the use of white-light interferometry for high-precision measuring. In this case, the utilization is either scanning, i.e., by adjusting the interferometer, and therefore slowly or with spectrally resolved detection, typically with restriction to a measuring range of a few millimeters. The field of use of such arrangements is therefore restricted and in particular workpieces having a strongly structured surface and correspondingly varying measuring distances cannot be measured or can only be measured with severe restrictions, for example, long travel times.

Other methods use a frequency-modulated laser beam as measuring radiation for an interferometric arrangement. Thus, for example, an approach is known from WO 2009/036861 A1, in which in a method for measuring surfaces, a frequency-modulated laser beam is generated and emitted onto the surface to be measured. After the measuring radiation reception of the backscattered from the surface as the target, the distance is determined by interferometry, wherein a measuring interferometer arm and a reference interferometer arm having a partially shared beam path are used. Deviations from the essentially perpendicular incidence of the measuring radiation on the surface in the case of distance measurements are taken into consideration by an algorithm or avoided or reduced during the scanning guiding by control of the emission of the measuring radiation.

The partially shared beam path of measuring interferometer arm and reference interferometer arm is delimited in this case by a reflection within the optical measuring head, which thus defines the reference interferometer. This so-called common path architecture permits the local oscillator plane to be arranged within the measuring head optic, for example, also on the optical exit surface, and therefore close to the target. The advantage of this construction is that environmental influences, for example, temperature changes or vibrations, act in the same way on both interferometer arms, so that the generated signals are subject to the same influences in this regard. However, one disadvantage of the construction is the requirement of a long coherence length, if a sufficient signal strength within the operating range is to be ensured.

In contrast, external interferometer arms having adjustable delay are used in the field of white-light interferometry. However, other boundary conditions are also provided for the common field of application of medical technology. Thus, these structures to be scanned or measured are fundamentally different in type and structured less with regard to the distances. In addition, absolute distance information is not necessary and the time scales typically required for a measurement are less than in the case of measurements of industrial parts. As a result of the surfaces to be measured, longer measuring durations are required here and as a result of the geometries to be measured, greater measuring ranges are typically also necessary. Solutions of this prior art are found, for example, in US 2004/061865, US 2008/117436, or DE 198 19 762, which describe white-light interferometers, which do not have a tunable laser source for generating frequency-modulated laser radiation. In U.S. Pat. No. 4,627,731, the division of the light signal upstream of the measuring interferometer into two paths having modulators of different frequencies is used to generate a heterodyne frequency. This so-called modulation interferometer also requires precise equalization of the path lengths.

In the case of interferometric measuring arrangements using frequency-modulated laser radiation, however, the measuring range is delimited by the coherence length thereof, so that the field of application is subject to restrictions and corresponding expenditure is required on the control side to be able to scan and measure a measuring object completely and in a short time.

One problem is to provide an improved measuring method or measuring arrangement, respectively, for measuring surfaces or for detecting surface topographies.

A further problem is to provide such a measuring method or a measuring arrangement, respectively, which overcomes the restrictions existing due to the coherence length and therefore increases the measurable distance range.

SUMMARY

The invention utilizes an interferometric measuring principle having a frequency-modulated, i.e., tunable laser source and corresponding measuring construction, as is also described, for example, in WO 2009/036861 A1.

According to the invention, in addition to the normal radiation field used for distance measuring, a delayed copy is provided, the delay of which substantially corresponds to the runtime of the actual measuring radiation to the target and back again, so that the effective distance is reduced. By way of this approach, the operating point of the entire measuring arrangement is shifted in the direction toward the target, so that the measurable maximum distance is enlarged and the restriction existing due to the coherence length is overcome. The optical path difference caused by the delay corresponds to the optical path difference, which corresponds in this case to a distance in the predefined distance range, plus or minus the coherence length of the laser. In particular, the optical path difference of the delay corresponds at most to the optical path difference, which corresponds to the distance to the surface to be measured, and at least to the optical path difference, which corresponds to the distance to the surface to be measured, minus the coherence length of the laser or else at least to the optical path difference, which corresponds to the distance to the surface to be measured, and at most to the optical path difference, which corresponds to the distance to the surface to be measured, plus the coherence length of the laser.

One approach for implementing a delayed radiation field according to the invention is the integration of a beam splitter having downstream optical delay section behind the laser source. Such a delay section can be implemented, for example, both as a free beam optic and also as a fiber section in a Mach-Zehnder interferometer. In this way, in principle identical radiation fields may be generated, which are only mutually time-shifted or time-delayed by the optical path difference.

For example, a Mach-Zehnder interferometer can be integrated as a delay section or delay component in a common path arrangement without changing the standard design. In this way, for example, the operating point of the interferometer can be displaced outside the optic, so that the restrictions normally caused by the coherence length can be overcome. In this case, the measuring range of 30 mm, for example, can be maintained, only its length in relation to the optical measuring head is shifted in the target direction, so that greater distances or spacings to the measuring object are also implementable. Greater distances in turn allow higher travel speeds of the sample head and therefore shorter measuring times or other measuring path geometries.

A further improvement of the arrangement according to the invention can additionally be achieved by a focal length of the lens system of the sample head which is designed for the setpoint distance.

To be able to prevent a change of the delay during or between the measurements, it is advantageous to design the delay component to be as mechanically and thermally robust as possible. The calibration can be performed in this case by means of known methods, for example, by scanning a reference sphere having known geometry.

BRIEF DESCRIPTION OF THE DRAWINGS

A measuring method according to the invention and a measuring arrangement according to the invention for the interferometric measurement of surfaces are described or explained in greater detail hereafter on the basis of exemplary embodiments, which are schematically illustrated in the drawings solely as examples. In the specific figures.

DETAILED DESCRIPTION

Figure 1:
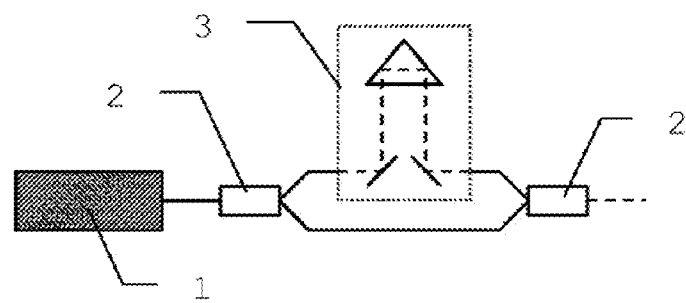
FIG. 1 shows the schematic illustration of the basic principle according to the invention of the optical delay of a radiation fraction in an interferometric distance measuring arrangement.

FIG. 1 shows the schematic illustration of the basic principle according to the invention of the optical delay of a radiation fraction in an interferometric distance measuring arrangement. In such an arrangement for measuring industrial workpieces, a laser beam is generated as measuring radiation MS by a frequency-modulated, i.e., tunable laser source 1, wherein it has a coherence length of greater than 1 mm, preferably of greater than 60 mm. In the optical beam path used for measuring the surface of the workpiece, a delay component is incorporated, which has two optical couplers 2, one of which is designed as a beam splitter for the measuring radiation of the frequency-modulated laser source 1, wherein this radiation is split into two radiation fractions.

One of the two radiation fractions is guided undelayed via the distance to be measured to the target and back again to the radiation detector, while the other fraction passes through at least one optical delay element or a delay section 3, by which one of the radiation fractions is time-delayed in relation to the other radiation fraction such that the resulting delay corresponds to twice the run time of the measuring radiation to a distance located outside the coherence length. In the ideal case, this distance will correspond to the distance to be measured to the surface of the workpiece or to another target, but can also deviate therefrom. According to the invention, however, the delay section 3 is designed such that the time delay corresponds to a distance which lies within a distance range which at least partially also contains possible measuring distances which are greater than the coherence length. According to the invention, the lower limit of the distance range can also already lie outside the coherence length.

Therefore, according to the invention, a second radiation field, which is delayed in relation thereto, is added to the tuned radiation field of the prior art. Both radiation fields are superimposed again at the radiation detector, wherein one of them was guided via the delay section. Instead of the one signal of the arrangement of the prior art, two signals are now generated, which are mutually shifted in accordance with the delay section and propagate in the measuring interferometer.

In the ideal case, both traversed sections, i.e., optical length of the delay section and twice the distance to the target, can be identical, so that a synchronization of the radiation fields on the detector occurs. In the normal case, however, it is sufficient if the delay caused by the delay section is sufficiently close with respect to time to the delay caused by the run section to the target and back again. The maximum extent of the difference or the required chronological proximity is predefined by the measuring range of the arrangement, i.e., the measuring arrangement can still process the runtime differences or optical path length differences, which lie within the measuring range, during the measurement. The measuring range is a function of the coherence length in this case. According to the invention, the measuring range already existing in arrangements of the prior art is therefore shifted in the direction toward the target, so that another operating point displaced on the target side results. The maximum extent of the shift is limited here in principle only by the maximum implementable time delay possibility, i.e., in the normal case, the optical length of the delay section. Finally, the delay caused by the target measurement with respect to the signal running in the reference section of the reference interferometer as a local oscillator is reduced by the delay section, so that a smaller effective measuring distance results in comparison to the undelayed arrangement. The conditions of the reception on the radiation detector and therefore the interferometric measuring principle used having its restrictions of the measuring range, which are predefined by the coherence length, are therefore fundamentally maintained. However, the location of the measuring range is shifted in space, so that in the case of unchanged coherence length and target-related relative relationships of the interferometer, the maximum measuring distance thereof is changed by the delay section.

Figure 2:
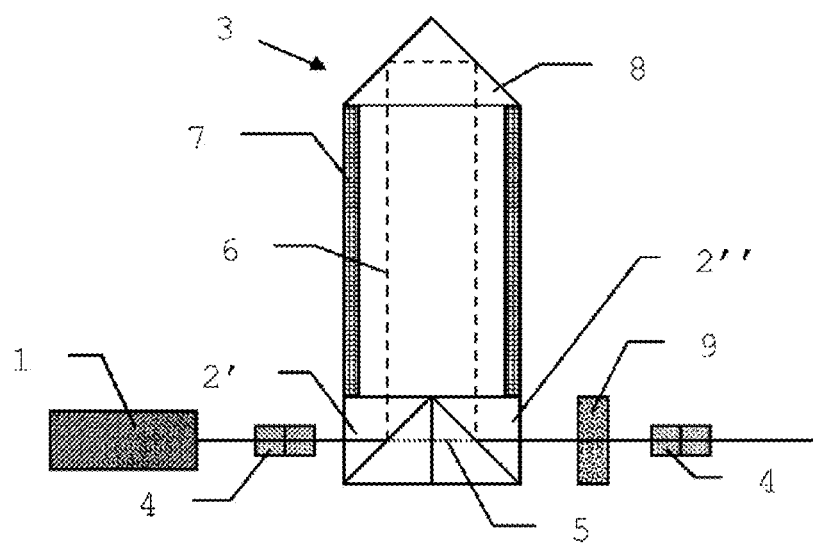
FIG. 2 shows the illustration of a first exemplary embodiment of a delay section for the distance measuring arrangement according to the invention.

FIG. 2 illustrates a first exemplary embodiment of a delay section 3 having fixed length for the distance measuring arrangement according to the invention, wherein the optical delay section 3 is designed in Mach-Zehnder configuration. The radiation field generated by the laser source 1 is guided via a collimator 4 and split by a first polarizing beam splitter 2' into two differently polarized radiation fractions, wherein the optical connection between laser source 1, collimator 4, and first beam splitter 2' is preferably embodied in fiber construction having a polarization-obtaining fiber. In this exemplary embodiment in Mach-Zehnder configuration, a n-polarized radiation fraction 5 is directly relayed, while in contrast the σ-polarized radiation fraction 6 is guided via the interferometer having an arm length of approximately 10 cm and an inversion prism 8 and finally combined again with the other radiation fraction.

As a possible design variant, it is advantageous to use a laser source 1 which emits in a polarization mode, so that together with the use of a polarization-obtaining fiber as a connection, a coupling at 45° into the interferometer is possible, which in turn allows a uniform splitting into the two differently polarized radiation fractions. Alternatively or additionally, however, a polarization controller connected upstream of the delay section 3 can also be used. Both radiation fractions 5 and 6 are guided back together in a second polarizing beam splitter 2" and relayed via a 45° polarizer and a collimator 4, wherein the connections can again also be embodied in fiber construction here. To achieve sufficient stability of the interferometer arrangement, the walls 7 thereof can be embodied in Zerodur.

Figure 3:
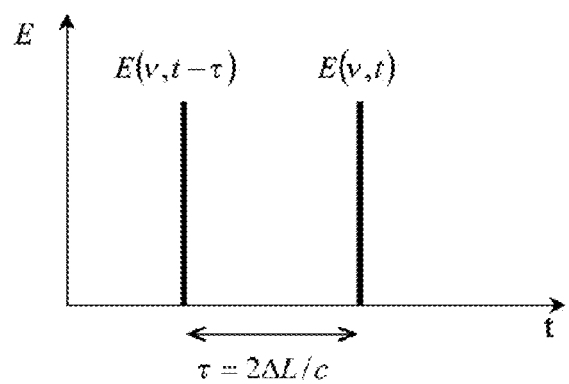
FIG. 3 shows the illustration of the effect of the basic principle according to the invention of the optical delay.

The effect of the optical delay unit according to the invention is explained in FIG. 3, wherein the field strength is illustrated in relation to the time, i.e., in the time domain. The laser source generates a radiation field, which is split into two radiation fractions, wherein $E(v,t)$ designates the undelayed fraction and $E(v,t-\tau)$ designates the radiation fraction delayed by $\tau=2\Delta L/C$. In this case, $\Delta L$ corresponds to the length of respectively one of the two arms of the Mach-Zehnder interferometer of the delay section and c corresponds to the speed of light. Both radiation fractions $E(v,t)$ and $E(v,t-\tau)$ then propagate jointly and offset in time through the interferometric measuring arrangement.

Figure 4:
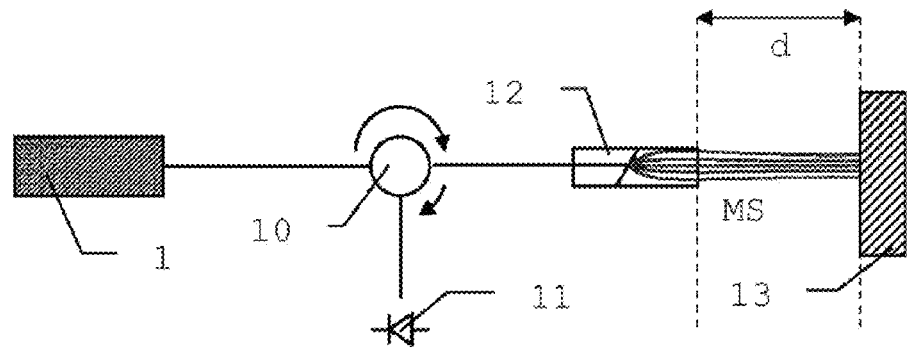
FIG. 4 shows the schematic illustration of the interferometric measuring arrangement in a measuring device of the prior art for measuring surfaces.

FIG. 4 shows the schematic illustration of the interferometric measuring arrangement in a measuring device of the prior art for measuring surfaces, as is known, for example, from WO 2009/036861 A1. Such an arrangement uses a frequency-modulated laser source 1 for generating at least one laser beam and a radiation detector 11 for receiving the measuring radiation MS, which is backscattered from a surface 13. The frequency-modulated laser source is preferably designed, for example, as a fiber ring laser, such that it has a coherence length of greater than 1 mm, in particular in the range from 1 mm to 20 cm, for example, a central wavelength between 1.3 and 1.55 μm and a tunable wavelength range of greater than 40 nm at a dynamic line width of less than 0.02 nm at a coherence length of 60 mm or more. The frequency-modulated laser source 1 is thus a laser source using which light which is tunable in its wavelength can be emitted within the wavelength range, i.e., light which is frequency-modulated in its light frequency or is tunable in its light color. The coherence length therefore also permits measurements over a depth or distance range of several centimeters.

The present invention thus relates to wavelength-tuned interferometry. An interferometric measuring principle using a laser source 1 which emits in a modulated manner with respect to the wavelength, i.e., with variable wavelength, is applied, wherein the measurements are performed in the frequency domain. In this case, the laser radiation generated by a laser source 1, for example, a laser diode, is modulated, by traversing a wavelength ramp and therefore changing the radiation in its emission frequency, for example.

Such a wavelength ramp can be designed in this case as a classic ramp, i.e., having a sequence of wavelengths to be traversed which rises or falls substantially linearly. Alternatively, however, the set of the different wavelengths can also be optionally modulated, i.e., in a way deviating from the linearly arrayed sequence, as long as only the set of the wavelengths is acquired and modulated once during one traverse of the ramp. The concept of the wavelength ramp therefore comprises in the broader meaning a set of different wavelengths which can indeed be moved into a rising or falling sequence, but are not necessarily traversed and modulated in this sequence. However, a preferred embodiment is designed having a sequence of alternating rising and falling linear ramps.

The laser radiation generated by the laser source 1 is coupled via an optical coupler 10 into the interferometer construction used for measuring, which is designed in common path geometry, i.e., a partially shared interferometer beam path for a measuring interferometer arm and a reference interferometer arm. The light, which is modulated in its frequency, from the tunable laser source 1, which is applied at the input of the delay section 3, is thus modulated in its wavelength. The reference interferometer arm is defined in this case by a reflection at the optical exit surface of a gradient index lens, so that a constant, in particular known distance is fixed, wherein further back reflections are avoided. The reference surface therefore lies in a transceiver optic 12, which integrates the components of the transmitter and receiver optics, within the beam shaping optic used for emitting the laser beam. The measuring interferometer arm is defined, in contrast, by the reflection at the surface 13 to be measured. The back-reflected light of a measuring interferometer arm and a reference interferometer arm is finally guided back via the optical coupler 10 onto the beam detector 11, which is preferably designed as an InGaAs detector having a bandwidth of greater than 100 MHz. Finally, the distance $\Delta L$ to be measured can be determined in an analysis unit.

In addition, a calibration interferometer (not shown here) having an optical detector 5 can also be used for taking into consideration or compensating for nonlinearities in the tuning behavior, wherein this calibration interferometer can be embodied in particular in an etalon configuration or Mach-Zehnder configuration.

Figures 5, 6:
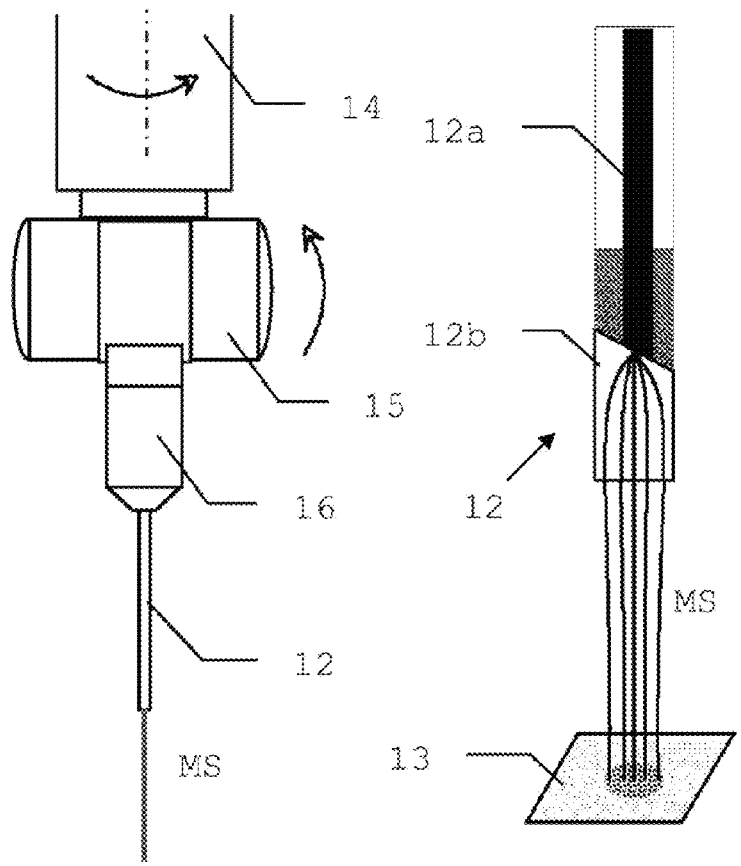
FIG. 5 shows the illustration of the structural construction of a sample head for such a measuring device.
FIG. 6 shows the schematic illustration of transceiver optic for such a measuring device.

Such a measuring arrangement can be integrated, for example, in a sample head of a coordinate measuring device for scanning measurement, as is known, for example, from WO 2009/036861 A1. The structural construction of such a sample head for such a measuring device is illustrated in FIG. 5. The coordinate measuring device has in this case guide means for the defined scanning guiding of the sample head over the surface to be measured and the sample head has at least one emission and reception beam path for the emission of measuring radiation MS of the interferometric distance measuring arrangement.

The sample head is guided by an arm element 14 and a joint 15 as guide means in a defined scanning manner over the surface to be measured, wherein a rotation of the joint 15 with respect to the arm element 14 is also possible. By way of the rotational ability in relation to the arm element 14 and the downstream joint 15, the sample head can well follow angled or strongly varying surface profiles. Fundamentally, however, still further rotational or translational degrees of freedom can be integrated in the guide means, to allow a further improved guiding of the sample head.

The sample head has at least one surface-side emission and reception beam path of the measuring beam MS. In this embodiment, the beam paths are guided through a thin tube, which contains the transceiver optic 12. The radiation detector itself or optical waveguides for relaying to a radiation detector integrated at another location can already be arranged in the thicker part 16 adjoining this tube. The sample head is controlled by the guide means such that the condition of substantially perpendicular incidence of the laser beam on the surface is maintained, in particular a deviation of +/−5° to the surface normal is not exceeded. The sample head can in this case be moved such that it is moved continuously having constant alignment relative to the surface tangent, in particular having emission and reception beam path oriented perpendicularly to the surface tangent.

FIG. 6 schematically shows the integration of transceiver optic 12 into the tube of the sample head. In this design, a fiber 12a is used for guiding the measuring radiation MS to be emitted and also to be reflected. The emission is performed in this case through a gradient index lens 12b arranged in the tubular part, which emits the measuring radiation onto the surface 13 to be measured and couples the measuring radiation MS reflected therefrom back into the fiber 12a.

Figure 7:
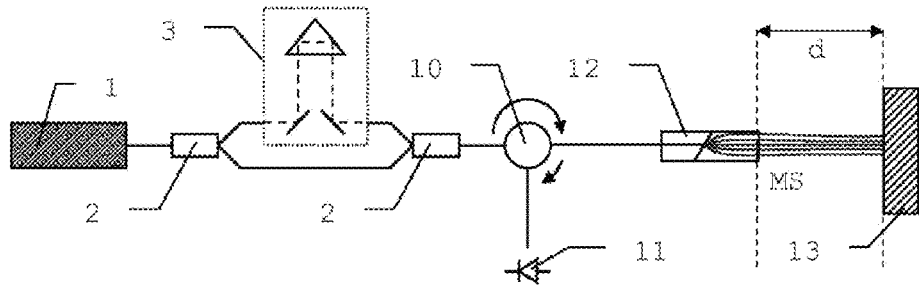
FIG. 7 shows the schematic illustration of a first exemplary embodiment of the interferometric measuring arrangement according to the invention.

FIG. 7 shows the integration of a delay section into the arrangement from FIG. 4 to implement a first exemplary embodiment of the interferometric measuring arrangement according to the invention. Behind the laser source 1 and a first beam splitter 2 for the measuring radiation, which splits it into two radiation fractions, at least one optical delay section 3 is incorporated, by which one of the radiation fractions can be time-delayed in relation to the other radiation fraction such that the delay which can be generated corresponds to twice the run time of the measuring radiation MS to a distance lying outside the coherence length, wherein this distance d to be measured can correspond to the surface of the target 13. By way of the use according to the invention of the delay section 3, measurements can now also be carried out to targets, the distance of which to the measuring arrangement is outside the boundaries set by the coherence length, but in particular is greater than the coherence length.

In this first exemplary embodiment, the delay section 3 is arranged in the beam path before the transceiver optic 12, so that the delay occurs before the emission.

This first exemplary embodiment can also have in the interferometric distance measuring arrangement a further interferometer as a calibration interferometer, wherein this can also be embodied in etalon configuration or Mach-Zehnder configuration.

FIGS. 8a-b and FIGS. 9a-b illustrate the radiation fields in the frequency domain for a first example and a second example of the length of the delay section in the arrangement of the first exemplary embodiment.

Figures 8A, 8B:
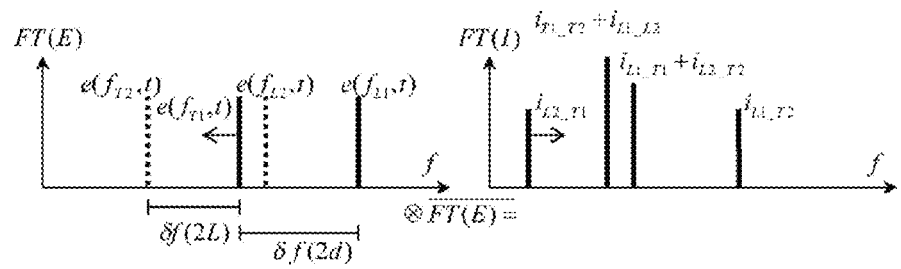
FIGS. 8a-b show the graphic illustration in the frequency domain for a first example of the radiation fields for the first exemplary embodiment.

FIGS. 8a-b show the graphic representation in the frequency domain for a first example, wherein by way of the use of a measuring interferometer arm and a reference interferometer arm and by way of the two radiation fractions, a total of four radiation fields are generated, which are superimposed during the interferometric distance measurements on the radiation detector.

The reflections of the reference arm as a local oscillator and of the target in the measuring arm are delayed in relation to one another by the runtime via the target distance d. Since two radiation fractions are coupled into the interferometric measuring arrangement having the reference arm and the measuring arm, a total of four interfering radiation fields therefore result on the radiation detector, wherein in the figures, the undelayed radiation fields are indicated with 1 and the delayed radiation fields are indicated with 2 and also L is indicated for the local oscillator (reference arm) and T is indicated for the target (measuring arm). As a result of the frequency modulation of the laser radiation, a time interval or a run section difference also corresponds in this case to a spectral difference δf.

The detected intensity I is a product of the radiation fields in the time or frequency domain, the Fourier transformation FT of the intensity I is a folding of the Fourier transformation FT of the fields E.

$$I=|E|^2=E(t)\cdot\overline{E(t)}$$

$$FT(I)=FT(E)\otimes\overline{FT(E)}$$

where $$E(t)=E_{L1}(t)+E_{L2}(t-\tau_{MZ})+E_{T1}(t-\tau_T)+E_{T2}(t-\tau_T-\tau_{MZ})$$

In this case, $E_{L1}(t)$ designates the undelayed radiation fraction which only runs via the reference section, $E_{L2}(t-\tau_{MZ})$ designates the delayed radiation fraction which only runs via the reference section, $E_{T1}(t-\tau_T)$ designates the undelayed radiation fraction which runs via the target distance, and finally $E_{T2}(t-\tau_T-\tau_{MZ})$ designates the radiation fraction which is both delayed and also runs via the target distance. In this case, $\tau_{MZ}$ represents the runtime of the radiation fractions guided via the delay section, and $\tau_T$ represents the runtime of the radiation fractions which run via the target distance. The spectral intervals $\delta f(2L)$ and $\delta f(2d)$ can be represented as functions of the optical path differences L and d.

In the graphic representation in the frequency domain of FIG. 8a, therefore four frequencies of the four radiation fractions or radiation fields result, from which the four beat frequencies shown in FIG. 8b result after the folding. The delayed radiation field interferes with the undelayed field in this case, so that an enlargement of the target distance or of the corresponding spectral interval $\delta f(2d)$, indicated by the arrow in FIG. 8a, results in a change of the frequency $e(f_{T1},t)$ and therefore the shift shown in FIG. 8b of the beat frequency $i_{L2\_T1}$.

For a frequency modulation with an increase of the optical frequency f, the first undelayed reflection has the highest frequency $e(f_{L1},t)$ at the time t. After the folding, the interference term of the two L fields has the highest intensity, but is suppressed because of its location outside the coherence range. The lowest beat frequency component $i_{L2\_T1}$ of the interference of the radiation fields $e(f_{T1},t)$ and $e(f_{L2},t)$, in contrast, represents the desired useful signal.

Figures 9A, 9B:
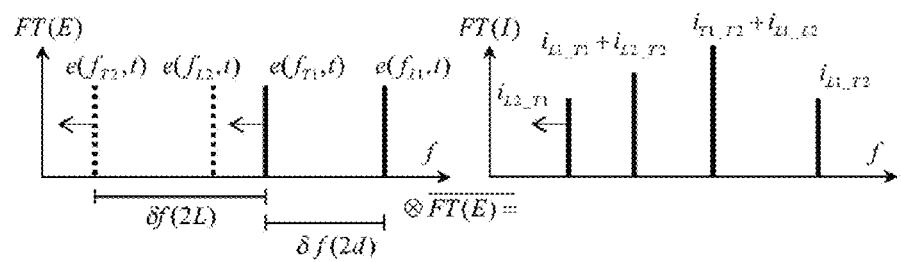
FIGS. 9a-b show the graphic illustration in the frequency domain for a second example of the radiation fields for the first exemplary embodiment.

FIGS. 9a-b show the graphic representation in the frequency domain for a second example of the radiation fields for the first exemplary embodiment, in which the delay caused by the delay component is selected to be greater than the runtime via the target section or is greater than twice the runtime of the measuring radiation to the surface to be measured.

In this case, the enlargement shown in FIG. 9a of the target distance d or of the corresponding spectral interval $\delta f(2d)$ results in a reduction of the beat frequency for $i_{L2\_T1}$ in FIG. 9b. Such a shift can offer advantages, since in this case the beats $i_{L1-T2}$ and $i_{T1\_T2}+i_{L1\_L2}$ are also shifted toward higher frequencies and therefore can be suppressed more strongly because of coherence.

In general, both sides of the coherence length with the exception of a direct-current region become usable by shifting the operating range outside the normal coherence length. However, the unambiguity is lost and care must be taken so that the correct side of the operating distance is selected.

Figure 10:
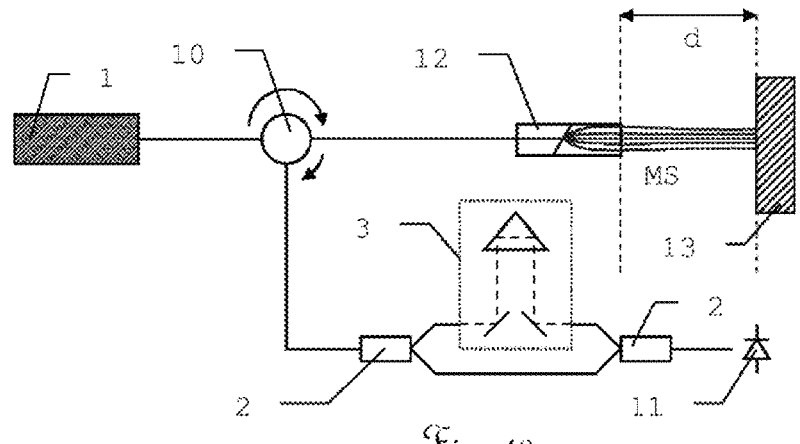
FIG. 10 shows the schematic illustration of a second exemplary embodiment of the interferometric measuring arrangement according to the invention.

FIG. 10 shows the schematic illustration of a second exemplary embodiment of the interferometric measuring arrangement according to the invention, in which the delay section 3 is incorporated in the beam path after the integrated transceiver optic 12 in an arrangement according to FIG. 4, so that the splitting into the radiation fractions with delay of one of the parts only occurs after the reception and immediately before the radiation detector 11. According to the invention, the entire delay can also be caused by different partial delay sections, however, which can also be arranged at various points of the beam path, if the desired total delay or optical path difference results for a radiation fraction.

Figure 11:
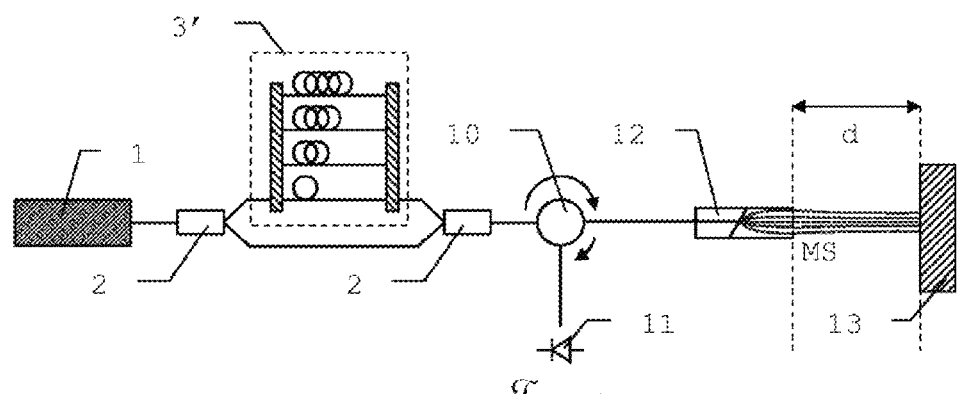
FIG. 11 shows the schematic illustration of a third exemplary embodiment of the interferometric measuring arrangement according to the invention.

A third exemplary embodiment of an interferometric measuring arrangement according to the invention is schematically illustrated in FIG. 11. While in the first and second exemplary embodiments, fixed delay sections of a defined length are used, in this case, with a construction otherwise unchanged from the first exemplary embodiment according to FIG. 7, a number of delay sections of different length which can be switched over is used, so that a plurality of selectable discrete delay times is provided. A certain overlap between the delay sections in conjunction with the possible coherence length can be advantageous in the calibration of the individual delay sections. In this case, the length difference between the delay sections is somewhat less than the coherence length, whereby a measuring range overlap occurs. Upon leaving one range, one also reaches the next range by switching over to the next delay length. The same distance can then be measured using two delay sections, which permits an assumption of a distance calibration. The delay sections can be formed in this case as fibers, as are available as standard components for applications of optical coherence tomography. Thus, for example, the producers General Photonics, Newport, OZoptics, and Santec offer as standard products fiber-coupled optical delay sections having delay times of up to 350 ps or a length of 110 mm.

Alternatively to delay sections which can be switched over, according to the invention, continuously or discreetly adjustable variants of delay sections, for example, interferometers having adjustable arm lengths, can also be used.

Figure 12:
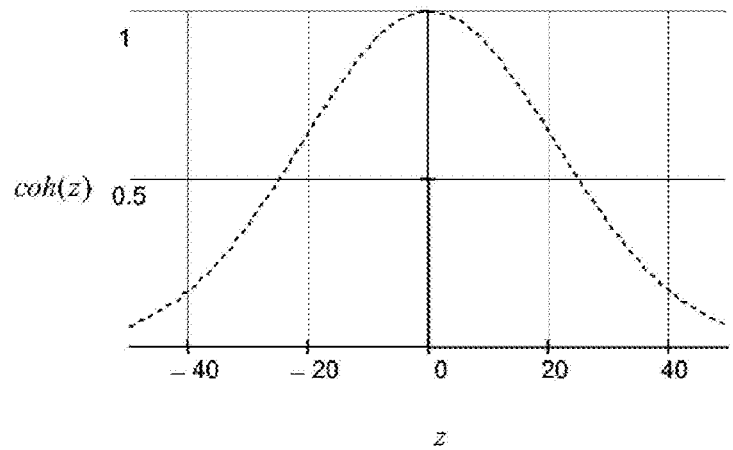
FIG. 12 shows the illustration of a coherence curve for the following simulations.

The effect of a delay section on measurements is illustrated in the following FIGS. 12 to 19 on the basis of simple simulation results. In this case, FIG. 12 shows the illustration of a coherence curve for the following simulations, which illustrate signal strengths and coherence effects. The fundamental coherence curve is defined as follows:

$$coh(z) = e^{-\left(\frac{2z \cdot \sqrt{\ln(2)}}{L_{coh}}\right)^2}$$

with z as an optical path difference and a coherence length of $L_{coh}:=50$ mm.

Figure 13:
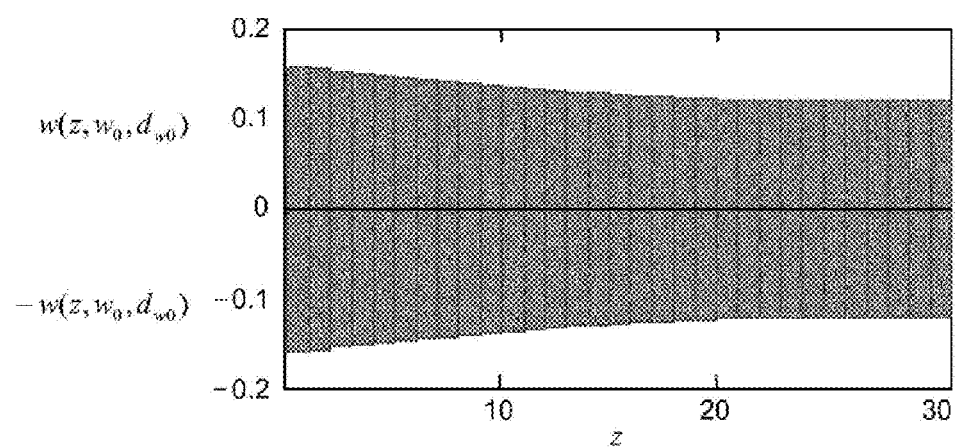
FIG. 13 shows the illustration of the beam cross section for a first simulation example of a distance measuring arrangement of the prior art.

The following definitions and equations apply for the simulations:
time delay:

$$\tau(d) := \frac{2d}{c}$$

phase: $\phi(t,\tau) := \pi \cdot v(t-\tau) \cdot (t-\tau)$
laser amplitude: $E_{Laser\_0} := 1$
laser field: $E_{Laser}(t,d) := E_{Laser\_0} \cdot e^{i \cdot \phi(t,\tau(d))}$
local oscillator
   length: $d_L := 0$ m
   reflectivity: $R := 1\%$
   oscillator-laser field: $E_L(t) := E_{Laser}(t,d_L) \cdot \sqrt{R}$
target-laser field: $E_T(t) := E_{Laser}(t,d_T) \cdot \sqrt{R \cdot L}$
radiation detector field: $E := (E_L(t) + E_T(t))$ FIG. 13 shows the beam cross section for a first simulation example of a distance measuring arrangement of the prior art without delay section.

The parameters for this example having a target distance of 30 mm and an optical path difference of 60 mm resulting therefrom read as follows:
Beam waist: $w_0 := 120$ μm
distance up to the beam waist: $d_{w_0} := 25$ mm
numeric aperture:

$$NA := \frac{w_0}{z_0(w_0)} = 0.00411$$

exit pupil: $D := w(0,w_0,d_{w_0}) \cdot 2 = 0.316$ mm
Rayleigh length: $z_0(w_0) = 29.2$ mm
target loss: $RL := NA^2 \cdot$ Albedo
and a power level, resulting from the target loss, of −58 dBm, wherein the albedo of a dark metal surface assumed as a target is set at 10%. Distance z (horizontal) and beam cross section (vertical) are each specified in millimeters.

For the sake of simplicity, to illustrate the coherence influence, it is applied as a modulation loss in the Fourier space, i.e., the Fourier transformed P'=FT(p) of the detected power p=(E·Ē) is multiplied by the coherence function P=P'·coh. The distance d or the optical path difference ($OPD_T \approx 2 \cdot d$ in air) corresponds to the frequency f via the equation $$OPD_T = \frac{c \cdot f}{\gamma}$$

with the spectral tuning rate $\gamma$ of the laser of $$\gamma = 20 \frac{THZ}{ms}.$$

Figure 14:
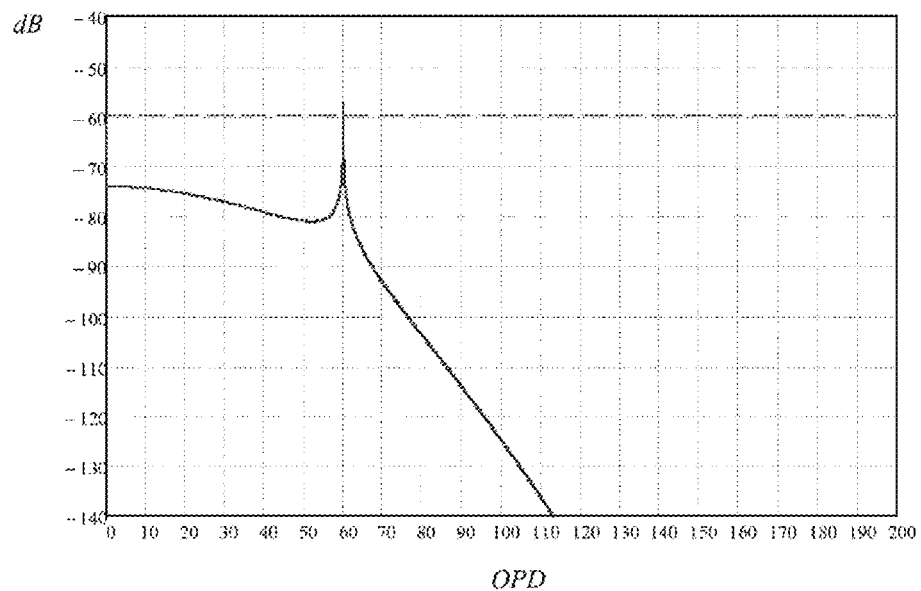
FIG. 14 shows the illustration of a tomogram of the received signal for the first simulation example.

The associated tomogram of the received signal for the first simulation example is illustrated in FIG. 14, wherein the power level in dB is plotted against the optical path difference d specified in millimeters. In reality, from a distance of 30 mm, the detection limit is reached because of coherence losses and noises. Therefore, in the simulation which does not consider these influences, the required signal strength should lie above the threshold, which is illustrated by a dashed line, of −60 dB, so that the conditions prevailing in reality can be taken into consideration.

As can be seen in the figure, the signal strength, shown by solid lines, without delay according to the invention reaches its maximum at an optical path difference of 60 mm or at a target distance of 30 mm and is therefore slightly above the sensitivity of approximately −60 dB.

Figure 15:
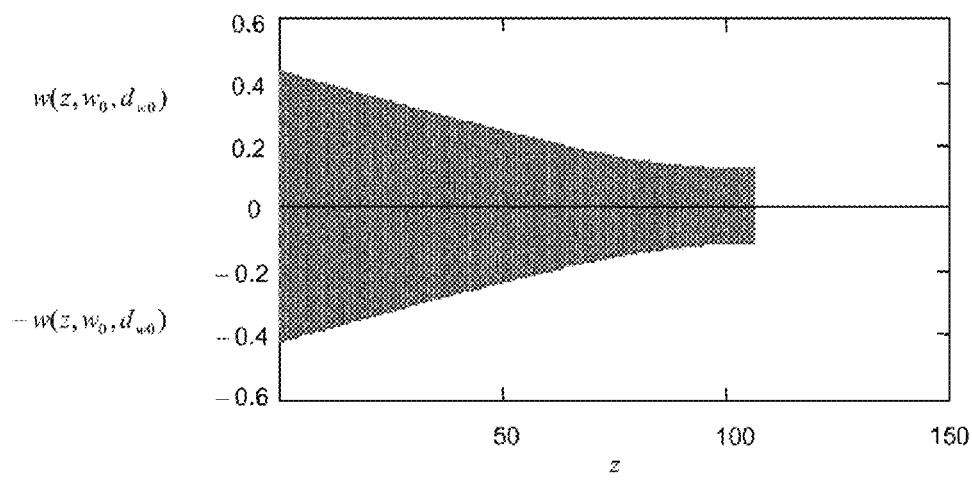
FIG. 15 shows the illustration of the beam cross section for a second simulation example.

FIG. 15 shows the illustration of the beam cross section for a second simulation example. The target distance is now 10 cm, so that an optical path difference (OPD) of 200 mm results. The numeric aperture corresponds to the first simulation example from FIG. 13. The distance to the beam waist is 100 mm, so that the exit pupil has a diameter of 0.857 mm.

Figure 16:
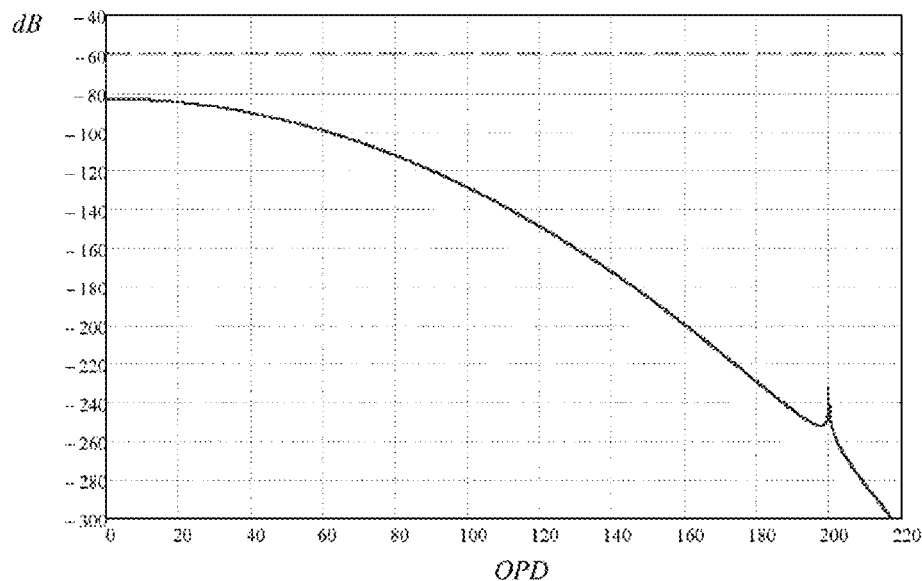
FIG. 16 shows the illustration of a tomogram of the received signal for the second simulation example without delay.

As can be seen from the associated tomogram of the received signal illustrated in FIG. 16, the maximum of the signal strength is significantly below the threshold of −60 dB to be set for realistic conditions, and is therefore for below a level of detectability.

Figure 17:
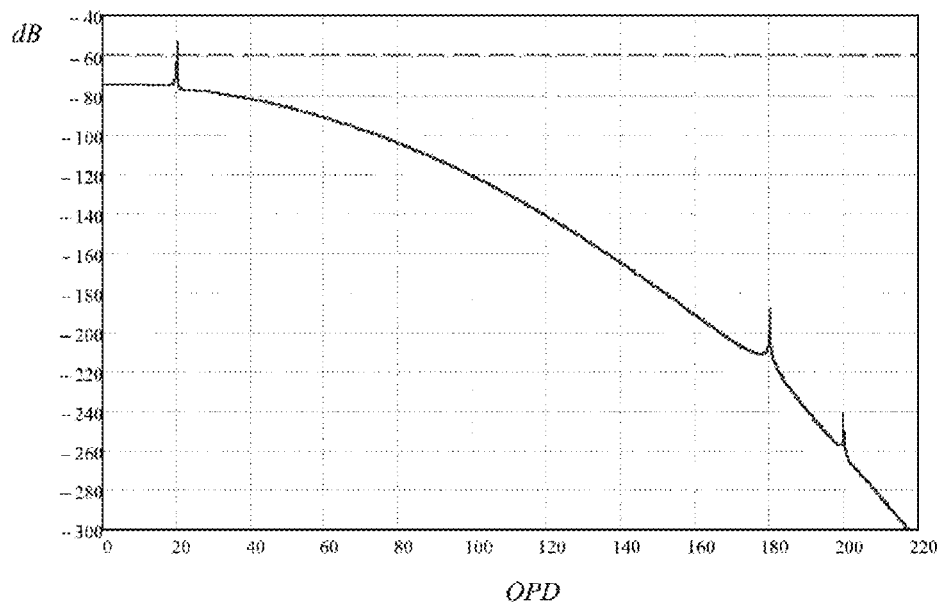
FIG. 17 shows the illustration of the tomogram of the received signal for the second simulation example with delay according to the invention.

This is contrasted with the results of a simulation having introduction according to the invention of a delay, as illustrated in FIG. 17 for the second simulation example.

A possible range is predefined by the coherence length of the laser in the case of the selection of the optical path difference of the delay section $OPD_{MZ}$. For a good signal analysis without delay, the distance or the $OPD_T$ thereof should be in the range of the coherence length:

$$0 < OPD_T < L_{coh}$$

If a delay section is used, this range is shifted by the $OPD_{MZ}$ of this section:

$$OPD_{MZ} < OPD_T < L_{coh} + OPD_{MZ}$$

The minimal delay section is in this case $$OPD_{MZmin} = OPD_T - L_{coh},$$

and the maximum is $$OPD_{MZmax} = OPD_T,$$

so that for the selection of the length of the delay section, the possible range results from $$OPD_{MZmin} < OPD_{MZ} < OPD_{MZmax}$$

$$OPD_T - L_{coh} < OPD_{MZ} < OPD_T.$$

In this case, which is also described by FIG. 8, an enlargement of the target distance results in an enlargement of the measured beat frequency, which corresponds to the so-called "normal" measuring range. The utilization of the other range, corresponding to FIG. 9, is also possible, in which the delay section is greater than the OPD of the distance and the enlargement of the target distance results in a reduction of the beat frequency, the so-called "inverse" measuring range:

$$OPD_T < OPD_{MZ} < OPD_T + L_{coh}$$

If the unambiguity of the measuring range—normal or inverse—can be determined by a movement of the target, for example, the delay distance can be in both ranges:

$$OPD_T - L_{coh} < OPD_{MZ} < OPD_T + L_{coh}$$

In the above-mentioned example with $$d = 100 \text{ mm} \rightarrow OPD_T = 200 \text{ mm and } L_{coh} = 50 \text{ mm},$$

and the restriction to the normal measuring range, the delay section must be in the range $$150 \text{ mm} < OPD_{MZ} < 200 \text{ mm}.$$

If a delay section is used, the laser field consists of two terms, wherein they are mutually delayed and $d_{MZ}$ designates the length of the delay section according to the invention (in air, the equation $$d_{MZ} \approx \frac{OPD_{MZ}}{2}$$

applies)

$$E_{Laser}(t, d) := \frac{1}{4} E_{Laser\_0} \cdot e^{i \cdot \phi(t, \tau(d))} \cdot \frac{1}{4} E_{Laser\_0} \cdot e^{i \cdot \phi(t, \tau(d + d_{MZ}))}$$

The losses generated by the splitting and guiding together of the radiation field are taken into consideration by the factor ¼. The target distance is again 10 cm and therefore the optical path difference ($OPD_T$) is 200 mm. To cause a delay, an additional section of the length of, for example, $d_{MZ} = 90$ mm (OPD=180 mm) is introduced for one of the two radiation fractions, which lies within the possible normal range.

In the tomogram, the effects of three of the four resulting beat frequencies are now identifiable. At 200 mm, the normal signal assignable to the target is recognizable, while in contrast at 180 mm, the signal associated with the delay section occurs. At 20 mm, the interference signal of delayed local oscillator radiation field and undelayed measuring interferometer radiation field, i.e., the interferometer arm comprising the target, is recognizable.

The interference signal located at 380 mm, composed of delayed local oscillator radiation field and delayed measuring interferometer radiation field, is not shown in the figure for reasons of clarity.

The signal at 20 mm is, in spite of the additional losses of 6 dB caused by the delay section, still above the sensitivity threshold and therefore well detectable.

Figure 18:
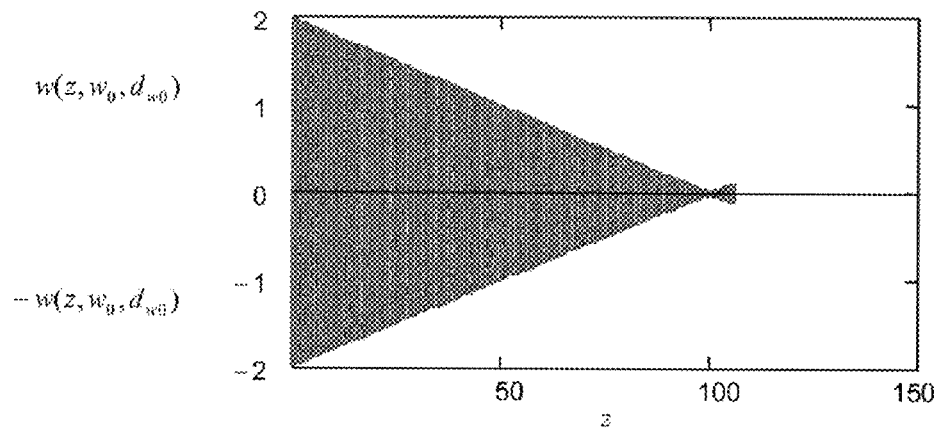
FIG. 18 shows the illustration of the beam cross section for a third simulation example of a distance measuring arrangement according to the invention having optimized optic.

FIG. 18 shows the illustration of the beam cross section for a third simulation example of a distance measuring arrangement according to the invention having an optic optimized for a target distance of 100 mm. The following parameters apply for this simulation example:
beam waist: $w_0 := 25$ μm
distance up to the beam waist: $d_{w_0} := 100$ mm
numeric aperture:

$$NA := \frac{w_0}{z_0(w_0)} = 0.01974$$

Rayleigh length: $z_0(w_0) = 1.267$ mm
exit pupil D:=$w(0,w_0,d_{w_0}) \cdot 2 = 3.947$ mm The albedo of a dark metal surface assumed as a target is set in this example at 10%, so that a power level resulting from the target loss of −44 dBm results. The numeric aperture can therefore be enlarged by the factor 5 and the losses can be reduced by 7 dBm, which means a correspondingly higher signal strength.

Figure 19:
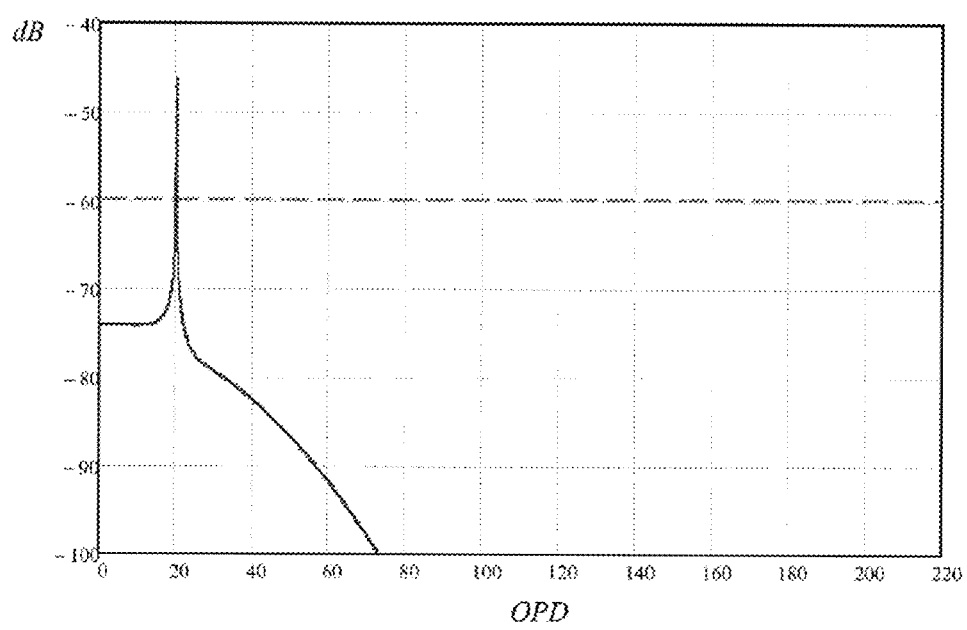
FIG. 19 shows the illustration of a tomogram of the received signal for the third simulation example with delay according to the invention.

The associated tomogram of the received signal is illustrated in FIG. 19 for the third simulation example with delay according to the invention. The significant exceeding of the detectability threshold at 20 mm can be recognized clearly.

Figure 20:
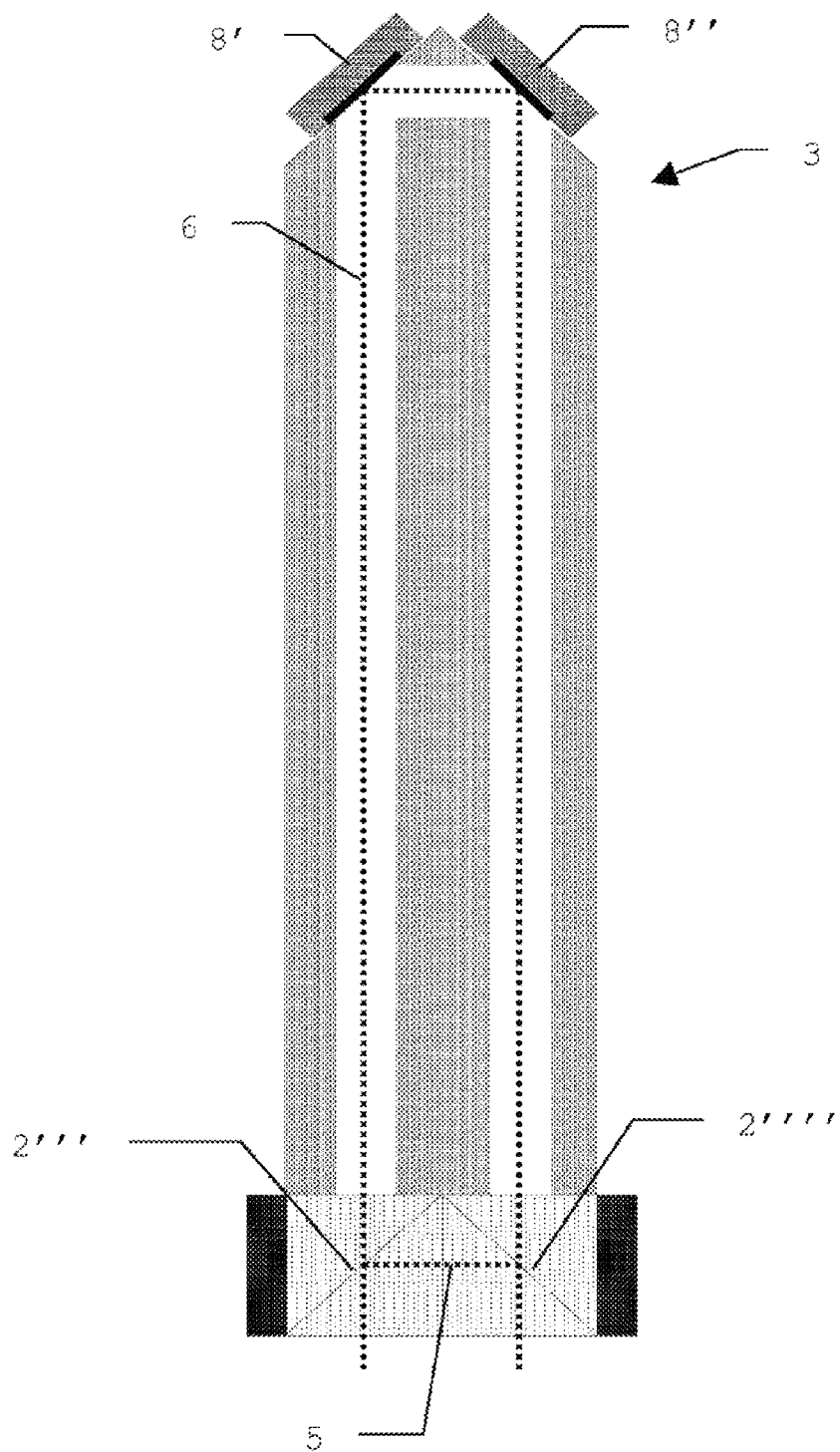
FIG. 20 shows the illustration of a second exemplary embodiment of a delay section for the distance measuring arrangement according to the invention.

FIG. 20 shows a concrete embodiment of the delay section 3 illustrated in FIG. 2. The coupling is performed from below into a first 50% beam splitter 2'''. A first radiation part 6 propagates in drilled-out and sealed air channels in a Zerodur part 7. A second radiation fraction 5 to a second 50% beam splitter 2'''', which guides together both radiation fractions 5 and 6 again. The two radiation fractions 2''' and 2'''' can be manufactured from $SiO_2$, for example, and the coupling and decoupling surfaces thereof can have an anti-reflective coating. The inversion prism 8 from FIG. 2 is embodied with the two illustrated reflectively coated (for example, with gold) Zerodur parts 8' and 8''.

The density in the air channels does not change via temperature and the optical path remains constant. The paths within the beam splitter are identical for both interferometer arms. The illustrated part 3 of the Mach-Zehnder interferometer is therefore athermal.

What is claimed is:

1. A distance measuring method for measuring surfaces, comprising:
   generating a laser beam, the wavelength of which is tunable by a frequency modulation of a laser source in a wavelength range to provide measuring radiation having a coherence length;
   emitting the measuring radiation onto the surface, which is located within a predefined distance range;
   receiving the measuring radiation backscattered from the surface; and
   interferometric distance measuring from a reference point to the surface employing a measuring interferometer arm and a reference interferometer arm;
   wherein:
   the predefined distance range lies at least partially outside the coherence length;
   the measuring radiation is split into two radiation fractions wherein one of the radiation fractions is time-delayed using a delay section in relation to the other fraction such that an optical path difference thus caused corresponds to an optical path difference, which corresponds to a distance in the predefined distance range, plus or minus the coherence length of the laser, and wherein the delay section is at least partially embodied in an athermal material and is implemented as a free beam optic; and
   after a first beam splitter, propagating a first radiation fraction in at least one air channel that is located in a part of an athermal material and, using a second beam splitter, guiding a second radiation fraction, branched off by the first beam splitter, together with the first radiation fraction;
   wherein the delay section includes an athermal interferometer arrangement such that the optical path in the at least one air channel remains substantially constant in the event of temperature changes.

2. The distance measuring method as claims in claim 1, wherein:
   the measuring radiation is emitted and is received again during a scanning guiding over the surface to be measured; and
   during the interferometric distance measurements, the measuring interferometer arm and reference interferometer arm have a partially shared beam path having a reference surface, which defines the reference interferometer arm and lies within a beam shaping optic used for emitting the laser beam.

3. The distance measuring method as claimed in claim 1, wherein the coherence length is greater than 1 mm.

4. The distance measuring method as claimed in claim 1, further comprising:
   splitting the measuring radiation into two radiation fractions, as a first radiation fraction and a second radiation fraction, wherein the first radiation fraction propagates in sealed air channels in a part of the athermal material; and
   combining the first radiation fraction and the second radiation fraction.

5. The distance measuring method as claimed in claim 1, wherein:
   the optical path difference caused by the delay corresponds:
   at most to the optical path difference, which corresponds to the distance to the surface to be measured; and
   at least to the optical path difference, which corresponds to the distance to the surface to be measured, minus the coherence length of the laser; or the optical path difference caused by the delay corresponds:
   at least to the optical path difference, which corresponds to the distance to the surface to be measured; and
   at most to the optical path difference, which corresponds to the distance to the surface to be measured, plus the coherence length of the laser.

6. The distance measuring method as claimed in claim 1, wherein:
   the delay occurs before the emission of the measuring radiation onto the surface to be measured.

7. The distance measuring method as claimed in claim 1, wherein:
   the delay occurs after the reception of the measuring radiation backscattered from the surface to be measured.

8. The distance measuring method as claimed in claim 1, wherein:
   a plurality of selectable discrete delay times is provided.

9. An interferometric distance measuring arrangement for measuring surfaces, comprising:

a frequency-modulated laser source for generating at least one laser beam, the wavelength of which is tunable by the frequency-modulated laser source, in a wavelength range, for providing measuring radiation having a coherence length;

an optical beam path having:
- a transmitting optic for emitting the measuring radiation onto the surface;
- a receiving optic for receiving the measuring radiation backscattered from the surface; and
- a measuring interferometer arm and a reference interferometer arm;

a radiation detector for receiving the measuring radiation backscattered from the surface; and one analysis unit for determining the distance from a reference point of the distance measuring arrangement to the surface, wherein:
- at least one beam splitter for the measuring radiation, which splits this measuring radiation into two radiation fractions;
- at least one optical delay section, by which one of the radiation fractions can be time-delayed in relation to the other radiation fraction such that an optical path difference thus caused corresponds to an optical path difference, which corresponds to a distance in the predefined distance range, plus or minus the coherence length of the laser; and
- the delay section is formed at least partially in an athermal material and is implemented as a free beam optic, wherein the at least one optical delay section includes:
  - after a first beam splitter, at least one air channel is positioned in a part of an athermal material such that a first radiation fraction is capable of propagating in the at least one air channel, a second beam splitter is positioned such that a second radiation fraction branched off by the first beam splitter is capable of being guided together with the first radiation fraction in the at least one air channel; and
  - the delay section includes an athermal interferometer arrangement such that the optical path in the at least one air channel remains substantially constant in the event of temperature changes.

10. The distance measuring arrangement as claimed in claim 9, wherein:
the radiation detector comprises an InGaAs detector having a bandwidth of greater than 100 MHz.

11. The distance measuring arrangement as claimed in claim 9, wherein:
the optical delay section is designed in Mach-Zehnder configuration;
the first beam splitter is a first 50% beam splitter, the second beam splitter is a second 50% beam splitter; or
the paths within first and second beam splitters for both arms of the interferometer arrangement of the delay section are equal.

12. The distance measuring arrangement as claimed in claim 11, wherein:
an inversion prism is embodied on the athermal material using two reflectively coated athermal parts; and/or
the first beam splitter and second beam splitter are manufactured from SiO2, wherein the coupling and decoupling surfaces thereof have antireflective coatings.

13. The distance measuring arrangement as claimed in claim 9, wherein:
the beam splitter splits the measuring radiation into two differently polarized radiation fractions.

14. The distance measuring arrangement as claimed in claim 9, wherein the delay section:
is continuously adjustable; or
is selectable from a plurality of delay sections of different lengths, wherein the delay sections are formed by optical fibers of different lengths.

15. The distance measuring arrangement as claimed in claim 9, wherein:
the delay section is arranged in the beam path before the transmitting optic.

16. The distance measuring arrangement as claimed in claim 9, wherein:
the delay section is arranged in the beam path after the receiving optic.

17. The distance measuring arrangement as claimed in claim 9, wherein:
the interferometric distance measuring arrangement has a further interferometer as a calibration interferometer in etalon configuration or Mach-Zehnder configuration.

18. The distance measuring arrangement as claimed in claim 9, wherein:
the receiving optic includes a combined transmitting and receiving optic.

19. The distance measuring arrangement as claimed in claim 9, wherein:
the measuring interferometer arm and the reference interferometer arm have a partially shared beam path.

20. A coordinate measuring device for measuring industrial workpieces, comprising:
guide means for the defined scanning guiding of a sample head over the surface to be measured; and
an interferometric distance measuring arrangement as claimed in claim 9,
wherein:
the sample head has at least one emission and reception beam path for the emission of the measuring radiation and
the beam path in the measuring interferometer arm and reference interferometer arm have a partially shared part, which defines the reference interferometer arm and lies within the beam shaping optic used for emitting the laser beam, the reference interferometer arm being defined by a reflection at the optical exit surface of a gradient index lens of the beam shaping optic.

* * * * *